J. E. CHAPIN.
Pipe-Coupling for Railroad-Cars.
No. 221,154.            Patented Nov. 4, 1879.
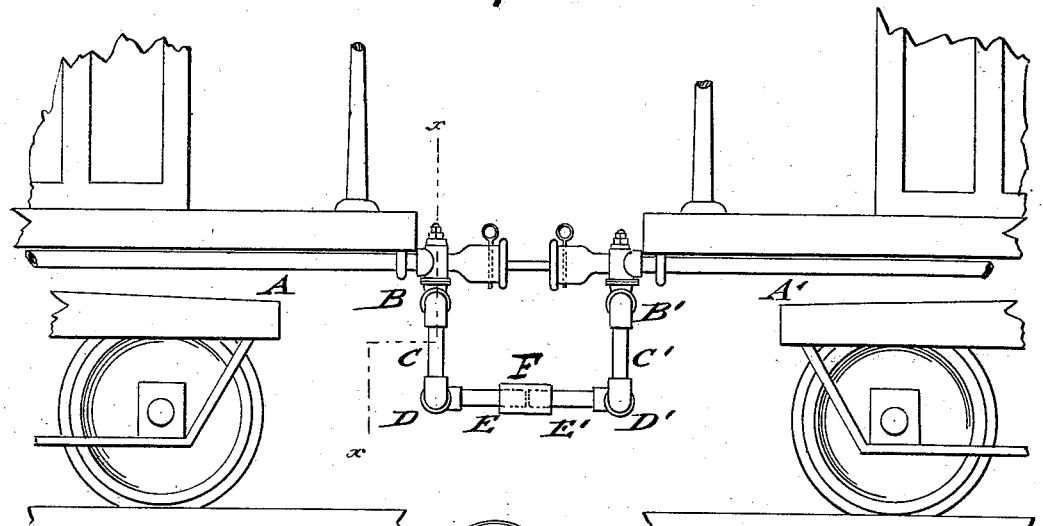
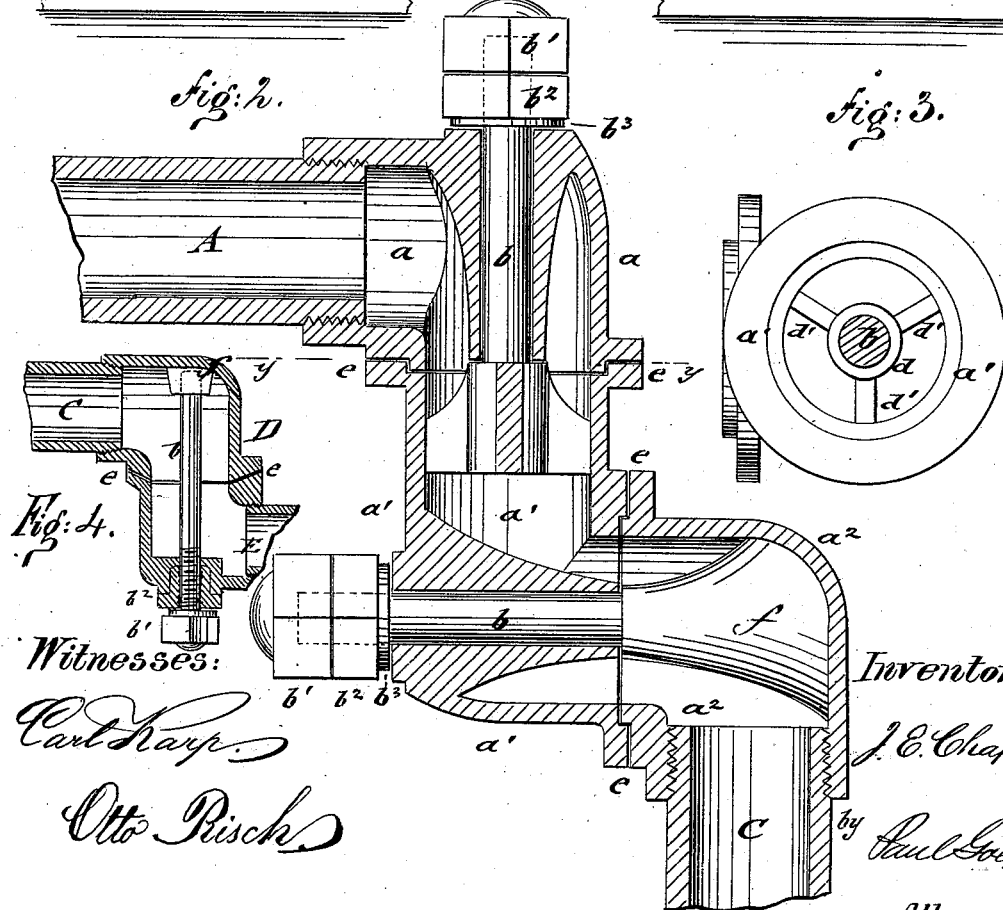
Witnesses:  
Carl Karp  
Otto Risch
Inventor:  
J. E. Chapin  
by Paul Goepel,  
Attorney.

UNITED STATES PATENT OFFICE.

JOHN E. CHAPIN, OF NEW YORK, N. Y.

IMPROVEMENT IN PIPE-COUPLINGS FOR RAILROAD-CARS.

Specification forming part of Letters Patent No. 221,154, dated November 4, 1879; application filed March 17, 1879.

*To all whom it may concern:*

Be it known that I, JOHN E. CHAPIN, of the city, county, and State of New York, have invented certain new and useful Improvements in Pipe-Couplings for Railroad-Cars, of which the following is a specification.

In the accompanying drawings, Figure 1 represents a side elevation of two cars arranged with my improved pipe-coupling. Fig. 2 is a vertical central section, on line $x\ x$, Fig. 1, of my improved flexible double pipe-joint on enlarged scale; Fig. 3, a horizontal section of the single pipe-joint, on line $y\ y$, Fig. 2; and Fig. 4 is a vertical central section of the single pipe-joint.

Similar letters of reference indicate corresponding parts.

The invention has for its object to furnish an improved pipe-coupling for railroad-cars, &c., for the purpose of conducting steam, air, water, &c., through the pipes used for heating them. The coupling is so jointed as to adapt itself quickly and reliably to the varying distances of the cars, longitudinally, as well as laterally, in rounding curves, the coupling being furthermore constructed in cheap and reliable manner, and so as to facilitate the passage of steam, air, or water through the pipes without being unnecessarily obstructed by sharp angles or contractions.

The invention consists of a flexible coupling, which is formed of several pipe-sections, which are connected by double angular joints with the rigid pipes running along the bottom of the cars, while single angular joints form the connection of the intermediate pipe-sections. The single joints provide for the motion in longitudinal direction, while the double joints provide both for longitudinal and lateral motion, so that the pipe-coupling is enabled to follow the motions of the cars.

The single pipe-joints are connected by means of a center-bolt that is screwed into a socket of the angular pipe end or elbow of one pipe-section, and extended through the angular pipe end or elbow of the adjoining pipe-section, the elbows being retained by a nut and jam-nut, and closed tightly by suitable packing. The double pipe-joints are obtained by an intermediate angular pipe end or elbow, and by a second bolt-connection, the latter being screwed into a socket supported by radial stays in the center of the intermediate elbow.

Referring to the drawings, A A' are the fixed pipes which run under each car, and are connected with the locomotive for receiving the steam, air, water, or other heating or braking agent. The pipes A A' of two adjoining cars are connected by a flexible pipe-coupling, which is composed of two double angular joints, B B', next to the ends of the fixed pipes A A' of short swinging pipe-sections C C', next to the double joints B B' of two single angular joints, D D', at the lower end of the pipe-sections C C', and, finally, of two short horizontal pipe-sections, E E', which are set at their opposite ends into the single joints D D', but connected at their adjoining ends by a coupling, F, of any suitable construction, which is coupled and uncoupled in the ordinary manner.

The double angular joints B B' are represented in Figs. 2 and 3, and are formed of three angular pipe portions or elbows, $a, a'$, and $a^2$, of which the first elbow is screwed to the pipe A, while the second or intermediate elbow, $a'$, is connected, by means of a screw-bolt, $b$, and nuts $b'\ b^2$, to the first elbow. The bolt $b$ is screwed, cast, or otherwise secured into a socket, $d$, of the intermediate elbow, $a'$. The socket $d$ is supported by radial stays $d'$ in the center of the intermediate elbow, $a'$, so that the steam or other heating agent may freely pass around the same.

The bolt $b$ passes through an opening of the elbow $a$ to the outside of the same, being there secured by the capped nut $b'$ and jam-nut $b^2$, and tightened by a gasket, $b^3$, of suitable packing material.

The intermediate elbow is connected to the third elbow by a bolt, nut, and jam-nut and suitable packing, in the same manner as the connection formed with the first elbow, with this difference, that the bolt is secured in a solid socket, $f$, of the third elbow. The elbows have flanges $e$ at their adjoining ends, which are ground off at their faces, so as to form, when the bolts are tightened, an intimate joint, through which the steam, &c., cannot escape. At the same time the elbows swing readily on the bolts and adjust themselves to the different positions of the pipe-sections of the coupling.

The short pipe-sections C C' are screwed at the upper ends into the lower elbows, $a^2$, and at the lower ends into the elbows of the single joints D D'. These joints are formed only of two elbows, connected by a bolt, nuts, and packing, they forming merely a single swing-joint. The horizontal pipe-sections E E' are screwed into the second elbows of the single joints D D', and coupled or uncoupled, as before described.

The single joints admit the adjustment of the pipe-sections in longitudinal direction, they following the approaching or receding motion of the cars, while the double angular joints supply the lateral motion required in rounding curves, and in following lateral vibrations, and also assist the adjustment of the pipe-sections in longitudinal direction. The pipe-coupling furnishes thus the required universal motion without the use of ball-and-socket joints, which are objectionable, as they are not only more expensive, but also kept tight with greater difficulty.

Having thus described my invention, I claim as new and desire to secure by Letters Patent—

1. In a pipe-coupling, the combination, with the fixed pipes A A', of a flexible coupling, composed of the double angular joints B B', short pendent pipe-sections C C', single swing-joints D D', and horizontal pipe-sections E E', substantially as and for the purpose specified.

2. In pipe-couplings, a double angular joint, constructed of three elbows, $a$ $a'$ $a^2$, of which the first and second and the second and third elbows are connected by center-bolts and nuts, so as to form a universal joint, substantially as set forth.

In testimony that I claim the foregoing as my invention I have signed my name, in presence of two witnesses, this 14th day of March, 1879.

JOHN E. CHAPIN.

Witnesses:
PAUL GOEPEL,
ADOLF DENGLER.